Patented Aug. 7, 1934

1,968,895

UNITED STATES PATENT OFFICE 1,968,895

SULPHUR DYE AND METHOD FOR ITS PREPARATION

Herbert A. Lubs, Wilmington, Del., assignor to E. I. du Pont de Nemours & Company, Wilmington, Del., a corporation of Delaware No Drawing. Application June 23, 1932, Serial No. 618,938

10 Claims. (Cl. 260—19)

This invention relates to sulphur dyes and more particularly refers to blue sulphur dyes of exceptional brightness and fastness, and methods for their preparation.

It is an object of this invention to produce brilliant blue sulphur dyes having excellent fastness to washing, light and chlorine. Additional objects will appear hereinafter.

These objects are attained by the process of the present invention wherein a leuco indophenol having the following formula:

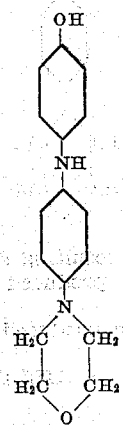

or an indophenol having the following formula:

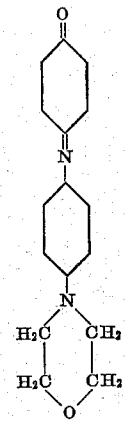

is thionated in an alkaline polysulphide solution.

The leuco indophenol or indophenol may be prepared by various methods, among which are reacting para-amino-phenyl morpholine and phenol, or reacting para-amino-phenol and phenyl-morpholine. Reference may be had to the following examples, which are given merely for purposes of illustration, for a more complete understanding of the invention.

Example 1

One part of the leuco indophenol having the following formula:

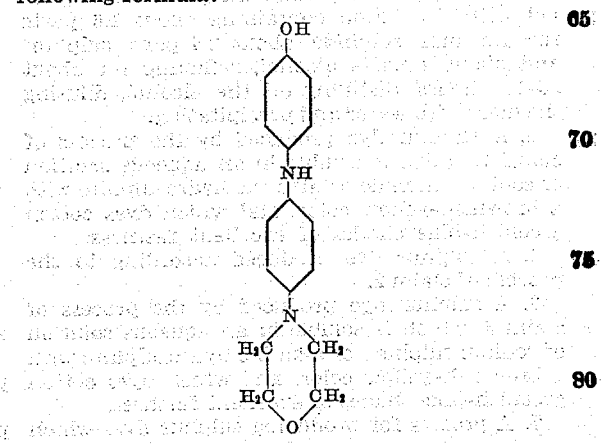

obtained by the joint oxidation of p-amino-phenyl morpholine and phenol, was heated with 1.6 parts of fused sodium sulphide, 2.4 parts sulphur and 7 parts of alcohol and refluxed from 90–100 hours. The alcohol was then distilled off, the mass diluted with water and the dye separated by aeration or other suitable means. The dye so obtained was soluble in an aqueous solution of sulphide or alkaline hydrosulphite, giving a brownish-yellow solution. Cotton was dyed from these solutions greenish-blue shades of good fastness.

The indophenol used as the starting material was also made by the simultaneous oxidation of p-amino-phenol and phenyl-morpholine.

Example 2

A similar dye was produced by the thionation of 1 part of the same leuco indophenol or its oxidized form by heating with 4 parts of the ethyl ester of ethylene glycol, 1 part fused sodium sulphide, and 24 parts sulphur for about 1 hour. The mass was then diluted, heated with 3 parts sodium sulphite and aerated until the dye was separated. It was then filtered off and dried.

Either the leuco indophenol or the indophenol may be used as a starting material. This material is thionated with an alkaline polysulphide solution, preferably a solution of sodium sulphide, sulphur, and alcohol or the ethyl ether of ethylene glycol. The dye is then precipitated by any of the usual methods, filtered and dried.

As previously mentioned, the product of the present invention is a brilliant blue dye which has exceptional fastness to washing, light and chlorine.

As many apparently widely different embodiments of this invention may be made without departing from the spirit and scope thereof, it is to be understood that I do not limit myself to the specific embodiments thereof except as defined in the appended claims.

I claim:

1. A process for producing sulphur dyes which comprises thionating the reaction product of p-amino-phenyl-morpholine and phenol with an alkaline polysulphide solution, and precipitating the resulting dye.

2. A process for producing sulphur dyes which comprises thionating the reaction product of p-amino-phenyl-morpholine and phenol with a solution of fused sodium sulphide, sulphur and alcohol, and precipitating the resulting dye.

3. A process for producing sulphur dyes which comprises heating about 1 part of the reaction product of p-amino-phenyl-morpholine and phenol with a solution containing about 1.6 parts fused sodium sulphide, about 2.4 parts sulphur, and about 7 parts alcohol, refluxing for about 90–100 hours, distilling off the alcohol, diluting the mass with water and precipitating.

4. A sulphur dye produced by the process of claim 1, which is soluble in an aqueous solution of sodium sulphide or alkaline hydrosulphite with a brownish-yellow color, and which dyes cotton greenish-blue shades of excellent fastness.

5. A sulphur dye produced according to the process of claim 2.

6. A sulphur dye produced by the process of claim 3, which is soluble in an aqueous solution of sodium sulphide or alkaline hydrosulphite with a brownish-yellow color, and which dyes cotton greenish-blue shades of excellent fastness.

7. A process for producing sulphur dyes which comprises thionating a compound of the following formula:

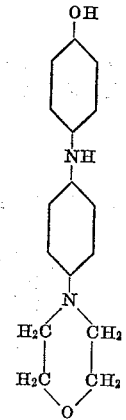

and separating the resulting dye therefrom.

8. A process for producing sulphur dyes which comprises thionating a compound of the following formula:

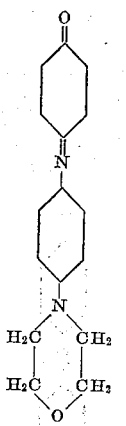

and separating the resulting dye therefrom.

9. A sulphur dye produced according to the process of claim 7.

10. A sulphur dye produced according to the process of claim 8.

HERBERT A. LUBS.

CERTIFICATE OF CORRECTION.

Patent No. 1,968,895.  August 7, 1934.

HERBERT A. LUBS.

It is hereby certified that error appears in the printed specification of the above numbered patent requiring correction as follows: Page 1, line 104, for "ester" read ether; and that the said Letters Patent should be read with this correction therein that the same may conform to the record of the case in the Patent Office.

Signed and sealed this 25th day of September, A. D. 1934.

Leslie Frazer (Seal)  Acting Commissioner of Patents.